US005454354A

United States Patent [19]
Miller

[11] Patent Number: 5,454,354
[45] Date of Patent: Oct. 3, 1995

[54] OIL FILTERING SYSTEM

[76] Inventor: William Miller, 3394 Hogan Dr., Kennesaw, Ga. 30144

[21] Appl. No.: 224,037

[22] Filed: Apr. 7, 1994

[51] Int. Cl.$^6$ .................................................. F01M 1/10
[52] U.S. Cl. .................... 123/196 A; 184/6.13; 184/6.24
[58] Field of Search ........................... 123/196 A, 196 R, 123/196 S; 184/6.24, 6.13

[56] References Cited

U.S. PATENT DOCUMENTS

| | | | |
|---|---|---|---|
| 2,976,864 | 3/1961 | Ford | 123/196 A |
| 3,763,960 | 10/1973 | John | 184/6.13 |
| 4,151,823 | 5/1979 | Grosse et al. | 123/196 A |
| 4,724,806 | 2/1988 | Hartwig | 123/196 A |
| 5,085,188 | 2/1992 | Gasparri et al. | 123/196 A |

Primary Examiner—Henry C. Yuen
Assistant Examiner—Erick Solis
Attorney, Agent, or Firm—James W. Kayden; Hopkins & Thomas

[57] ABSTRACT

A combined oil filter/reservoir cartridge for an internal combustion engine mounted outboard of the engine for easy access. The device includes an oil filter and has sufficient capacity to hold all of the engine oil. An auxiliary oil pump is included to pump fresh oil from a new device into the engine and to pump the old oil into the reservoir. The device can then be demounted and the contents and cartridge recycled.

14 Claims, 2 Drawing Sheets

OIL FILTERING SYSTEM

FIELD OF THE INVENTION

The invention relates to a unitized oil filter and oil reservoir to be used in an oil lubricating system such as an automobile engine. The unitized filter/reservoir is encased in a cartridge which is designed to be easily disconnected and removed from the oil lubricating system and thus be conveniently packaged for disposal. Preferably, all parts of the cartridge, including the engine oil, the oil filter and the plastic container, are recycled after use.

BACKGROUND OF THE RELEVANT ART

Engine oil eventually becomes contaminated with sludge, metal particles and other debris and must be periodically removed from the engine and replaced with fresh oil. Relatively recent environmental concerns call for the earth-friendly disposal of the used oil with the oil preferably being recycled. Currently, most automobile engines are designed so that the oil pan is the reservoir for circulation of engine oil. Engine oil is drawn from the oil pan and then pumped tinder pressure through internal oil distribution passages drilled in the engine block, crank shaft, connecting rods, bearings, etc. The oil lubricates the parts of the engine and then drains back to the oil pan to be recirculated again. The oil is also normally passed through an oil filter mounted on the engine within the circulation pathway. A drain plug is located in the lower region of the oil pan and to change the oil, this drain plug is removed and the oil is permitted to flow under gravity out of the pan and into a receptacle placed underneath the engine. The drain plug is replaced after the oil has been allowed to drain out of the engine. Typically, at this time the oil filter is also replaced. New oil is then poured into the engine through an inlet to the oil distribution system, the inlet being located at or near the top of the engine. This process of changing engine oil can be both time consuming and messy. Additionally, the process results in a collection of spent, contaminated, oil and an oil filter which must be disposed of in an environmentally friendly way.

Several U.S. patents issued to Bedi (i.e., U.S. Pat. Nos. 5,209,198, 5,090,376) illustrate another technique for changing engine oil. Essentially, an external pump device is connected to the oil distribution system and the oil is pumped out of the engine. This method has an advantage over the above gravity removal method in that practically all of the oil can be removed from the system. Also, the oil removed from the engine can be easily collected and recycled. However, this method is not well suited for home use due to the expense and size limitations of the device.

Several patents disclose novel designs For oil filters. U.S. Patent No. 2,348,247 to DuShane Jr. teaches an oil filter and means whereby the oil in the oil filter is temperature controlled so the oil will travel quickly through the filter. U.S. Pat. No. 4,207,187 to Booth teaches an apparatus for filtering and cooling oil. Neither of these references teaches a unitized filter and oil reservoir encased within a cartridge whereby the entire supply of oil can be collected in the reservoir and in which the oil and the filter are removed and discarded, preferably via recycling.

SUMMARY OF THE INVENTION

The present invention allows for easy, clean and safe changing of the oil and the oil filter of an engine such as an automobile engine. The invention is also an environmentally safe fluid recycling system.

The device of the present invention is unitized and includes an oil filter and an oil reservoir encased in a container means, or cartridge. The cartridge is placed in-line in the oil distribution system of the engine. There is an inlet to the cartridge located in the top part of the cartridge. An oil filter is located within the top part of the cartridge. An outlet pipe extends down into the reservoir and to the outlet of the cartridge. Oil flows from the oil pan to the cartridge, through the filter and into the reservoir. The outlet pipe removes the oil from the reservoir and out of the cartridge to the engine parts to be lubricated.

The inlet and the outlet ports of the cartridge connect to the oil distribution system by quick disconnect members so that the cartridge can be easily disconnected from the system. When it is desired to change the oil in the engine, a pump is activated and all of the oil within the engine collects in the reservoir of the cartridge. The entire unitized cartridge is then removed and replaced with a fresh cartridge which contains clean oil and a new oil filter.

The entire cartridge is designed to be recyclable. The consumer can take the entire cartridge to a recycling center where the spent oil, the spent oil filter and the plastic cartridge container can all be recycled.

An alternative embodiment of the present invention utilizes a cartridge with a body and a cover plate. The cover plate can be removed from the body and the oil filter removed from the cartridge and replaced with a clean filter. In this way, the cartridge body is not recycled each time the oil and oil filter are changed.

Thus, it is an object of the invention to provide a unitized oil filter and oil reservoir in a single cartridge for engines, such as automobile engines, and to provide for the easy removal and replacement of such a cartridge into and out of the automobile engine compartment.

A further object is to provide a unitized oil filter and oil reservoir in a single cartridge such that the entire cartridge can be easily recycled.

Another object of the present invention is to provide an externally mounted oil filter and storage assembly in which the oil and filter are quickly and easily changed out of a reusable cartridge and which assembly is economically produced and used.

An additional object of the present invention is to provide a secondary oil collection and circulation system for an internal combustion engine and to provide a means for easily collecting the oil ad removing the oil and filter therefrom to facilitate recycling of the oil and filter.

A still further object is to provide a means for easily recycling the oil and oil filter from an automobile engine by combining the two parts into one single cartridge, which is easily transportable to a recycling station.

BRIEF DESCRIPTION OF THE DRAWINGS

In the present description, reference is made to the following drawings in which like reference numerals are used to refer to like elements throughout the similar views and in which.

DETAILED DESCRIPTION OF THE PREFERRED EMBODIMENT

Figure 1:
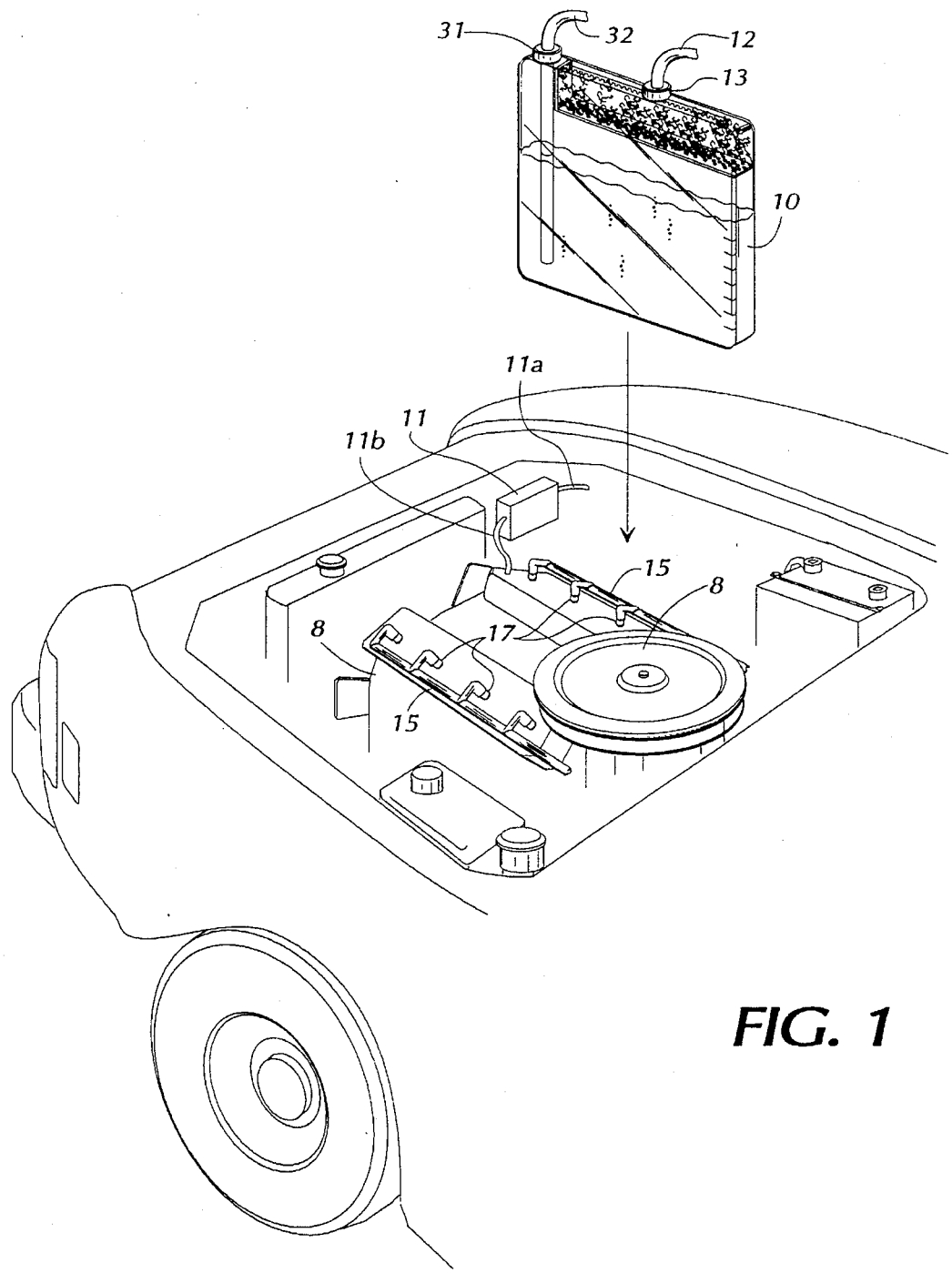
FIG. 1 is a drawing illustrating the placement of the device within a car engine compartment.

Referring now more specifically to the drawings, and to FIG. 1 in particular, shown is a schematic illustration of an automobile engine. In the present invention, the typical engine is modified to include an auxiliary oil pump 11 having an inlet 11a and an outlet 11b and the oil filter/reservoir cartridge 10 having an inlet 13 and an outlet 31. Pump 11 and cartridge 10 are mounted in the engine compartment in a convenient location under the car hood using a mounting bracket (not shown) or similar means such as is used to hold a conventional coolant recovery tank. Cartridge 10 communicates with the engine oil distribution system through inlet hose 12 and outlet hose 32. Inlet hose 12 transfers oil from the oil pan or pump at the bottom of the engine to cartridge 10. The auxiliary pump 11 can be inserted in-line between the oil pan and cartridge 10. Outlet hose 32 transfers oil from cartridge 10 to the cylinder heads of the engine through conduits 15 as shown in FIG. 1. Conduits 15 may simply direct the oil back into the oil distribution system, or they may terminate in spray heads 17, which spray the oil through the valve covers and onto the cylinder heads. From this point, the oil is distributed through the engine in a conventional manner.

Figure 2:
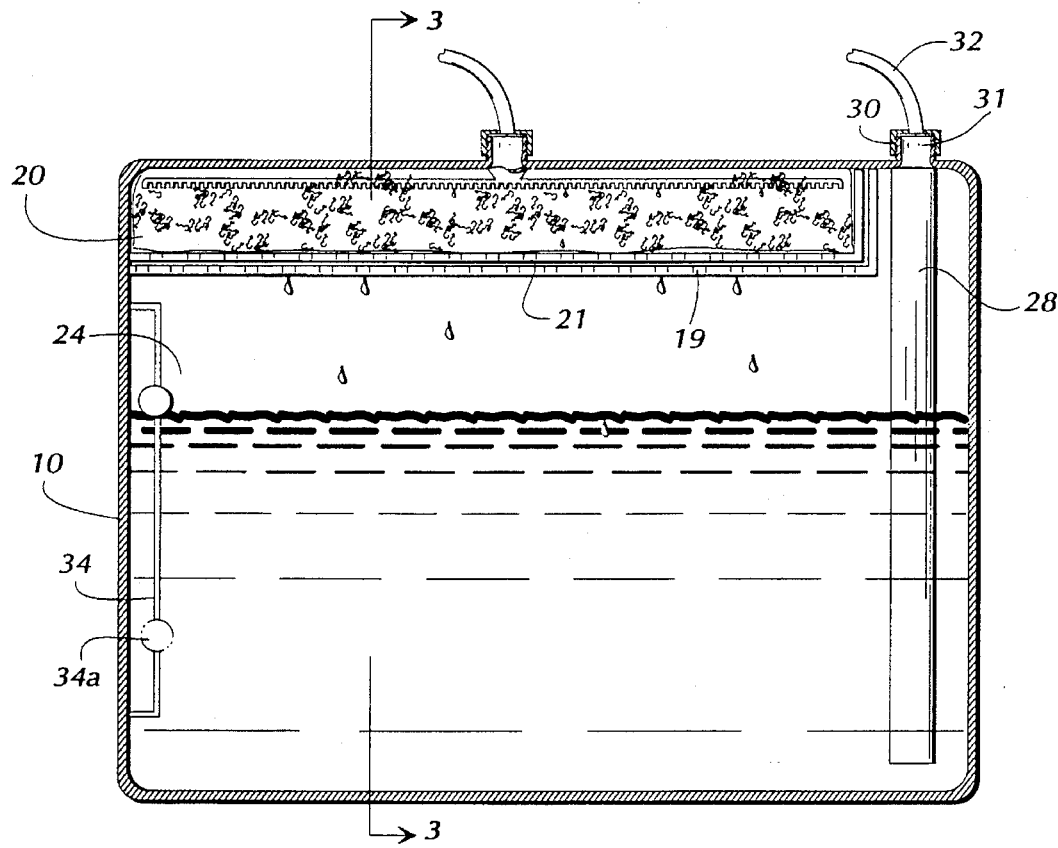
FIG. 2 is a cross-sectional view of the cartridge.
Figure 3:
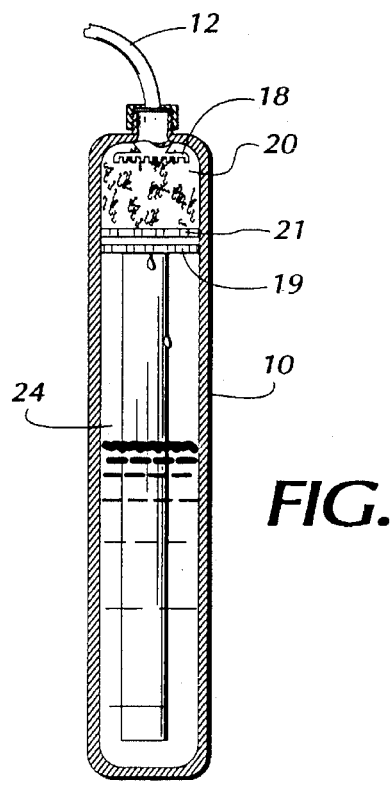
FIG. 3 is a cross-sectional view of the cartridge taken along line 3—3 of FIG. 2.

As shown in FIGS. 2 and 3, cartridge 10 includes an oil filter 20 and an oil reservoir 24. Filter 20 comprises approximately 20% of the volume capacity of cartridge 10. Reservoir 24 is of sufficient volume such that the total amount of oil contained in the engine may collect in reservoir 24 when the reservoir is initially full or just prior to changing the cartridge 10.

Cartridge 10 is preferably made of a recyclable material, such as a recyclable plastic, metal, fiberglass, etc. While shown as a rectangular member, the cartridge may be any suitable shape, as dictated by the engine compartment. Similarly, the cartridge may be mounted in any suitable location, but preferably within easy reach of the owner or mechanic when the hood is opened. In addition, certain vehicles may have more than one cartridge. Oil filter 20 is composed of some appropriate oil filter material such as a suitable polymeric fiber, which can preferably be recycled.

Inlet hose 12 attaches to cartridge 10, preferably near the center of the top surface of cartridge 10, with quick connect inlet adapter 14. Oil is pumped from the oil pan by the auxiliary oil pump 11 through inlet hose 12 and into cartridge 10.

Filter 20 is located in the top part of cartridge 10 where it is kept in position by plastic divider 19 and baffle 21. Bleeder bar 18 covers the upper surface of filter 20 and allows for the dispersion of the oil across the top surface of filter 20 as the oil enters cartridge 10. Baffle 21 supports the filter 20 and allows for oil to drip into reservoir 24.

Outlet pipe 28 extends into reservoir 24 and connects to cartridge 10 at the top of the cartridge in conjunction with outlet hose 32. Outlet hose 32 connects to cartridge 10 using quick connect outlet adaptor 30.

In the use and operation of oil filter/reservoir cartridge 10, the operator or consumer purchases a new cartridge at an automobile supply store or other outlet. The new cartridge is fully assembled with filter 20 and reservoir 24, and contains a sufficient amount of oil to fill the vehicle oil distribution system to its recommended operating capacity.

Before removing the old, used, cartridge 10, the operator turns on auxiliary pump 11 so that all of the engine oil is pumped into reservoir 24. The operator then disconnects and removes cartridge 10 from the oil distribution system by disconnecting the quick connect inlet adapter 14 and quick connect outlet adapter 30. The old cartridge 10 is then capped to prevent spillage and taken back to the automobile supply store or recycling center where it can be processed for re-use.

The operator places the new cartridge 10 in its appropriate place in the engine compartment and connects it to the engine oil distribution system via quick connect inlet adaptor 14 and quick connect outlet adaptor 30. Auxiliary pump 11 is then activated so the oil in reservoir 24 fills the oil distribution system. Auxiliary pump 11 is then turned off and the oil is circulated through conventional means, i.e., the engine oil pump provided with the vehicle engine.

Oil enters the cartridge through inlet hose 12. The oil encounters bleeder bar 18 which causes the oil to spread out above filter 20 before passing into and through filter 20. Oil flows through baffle 22 and into reservoir 24. Outlet pipe 28 transfers oil from reservoir 24 to the oil distribution system by outlet hose 32, the oil being drawn out of the reservoir by means of the vehicle's engine oil pump.

An additional feature of the invention is shown in FIG. 3. Appropriate volume markings are provided on cartridge 10 so that the user may be sure that the cartridge is full prior to installation. With the oil distributed in the engine, these markings may also be used to indicate if the engine is low on oil. For example, it is desirable that the reservoir does not get completely empty to maintain good flow characteristics in the present system. A float having a suitable sensing means can be employed to accomplish this end. Thus, with the oil fully distributed, it is likely that the reservoir will contain approximately one quart of oil, as is the case with conventional oil filters. Should the level in the reservoir drop below the one quart (or liter) marking, then the mechanic or car owner can add oil to the system through the inlet 13.

Figure 5:
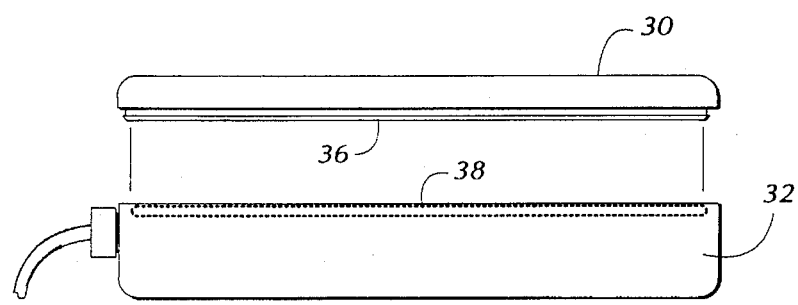
FIG. 5 is a drawing illustrating the tongue and groove fastening means of the alternative embodiment of the invention shown in FIG. 4.
Figure 4:
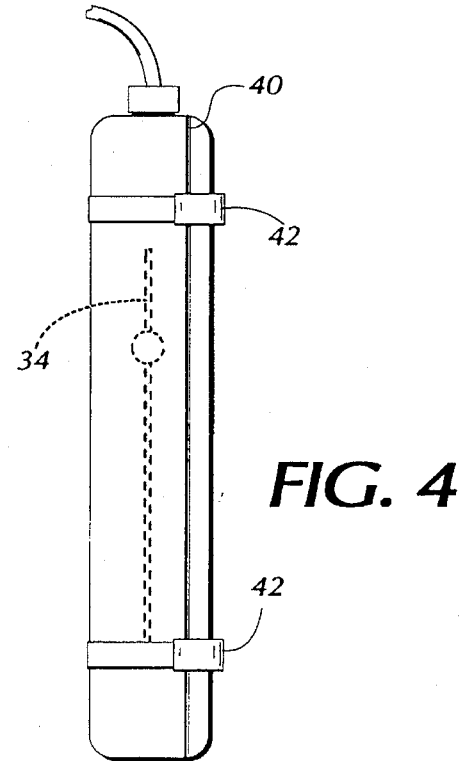
FIG. 4 is a cross-sectional view of an alternative embodiment of the invention.

An alternative embodiment of the invention is shown in FIG. 4. One side of the cartridge is removable as cover plate 30 from the body portion 32. As shown in FIG. 5, the cover plate 30 is edged in a male tongue 36 which engages the female groove 38 at the periphery of body portion 32. Inside the groove 38 is an 0-ring 40 which provides for a liquid tight seal when the edges of cover 30 and body 32 are mated. Clamp means 42 secures together cover 30 and body 32° This embodiment eliminates the need to recycle the entire cartridge assembly, as the cover and body are reuseable. The filter spent or dirty oil can be replaced and the cover and body can be cleaned and reused.

As shown in FIGS. 2 and 4, float assembly 34 is disposed in the cartridge below the filter means 20. Float assembly 34 communicates with the auxiliary oil pump 11 so that if the oil level of cartridge 10 reaches the lowest specified level, i.e., point 34a, the pump 11 either shuts down and/or causes a warning light or buzzer to sound, alerting the car owner to add oil to the system.

Thus, while an embodiment of an oil filtering system and modifications thereof have been shown and described in detail herein, various additional changes and modifications may be made without departing from the scope of the present invention.

I claim:

1. A combined oil filter/reservoir for an internal combustion engine comprising:

a cartridge means with an inlet from the engine and an outlet to the engine;

a filter located within the cartridge means and below the inlet for filtering impurities out of the oil;

a reservoir located within the cartridge means, below the outlet, having sufficient capacity to hold all of the oil necessary for lubrication of the engine;

means for transferring oil from the reservoir to the outlet from where it is recirculated through the engine and back again; and bleeder bars extending across the top of the filter and located between said inlet and said filter for distributing the oil evenly across the filter.

2. The oil filter/reservoir of claim 1 and further comprising:

means for quickly connecting and disconnecting the cartridge means from the engine via said inlet and outlet.

3. The oil filter/reservoir of claim 1 and further comprising:

a baffle extending across the bottom of the filter and located between the filter and the reservoir for allowing oil to seep from the filter into the reservoir.

4. The oil filter/reservoir of claim 1 where the cartridge is a recyclable plastic.

5. The combined oil filter/reservoir of claim 1 and further comprising:

said cartridge means having a cover plate and a body portion with a sealing means disposed therebetween and wherein said cover plate is removable from said body portion and the filter can be removed from the cartridge.

6. A combined oil filter/reservoir for an internal combustion engine comprising:

a cartridge with an inlet and an outlet, both connected to the engine oil distribution system;

a filter within the cartridge so that oil from the engine oil distribution system enters the cartridge through the inlet and passes through the filter so that impurities are filtered out of the oil;

a bleeder bar extending across the top of the filter so that oil entering the cartridge through the inlet encounters the bleeder bar and spreads out across the bleeder bar before entering the filter;

a reservoir within the cartridge, having sufficient capacity to hold all of the oil necessary for lubrication of the engine;

a baffle extending across the bottom of the filter for allowing oil to drain from the filter into the reservoir;

means for transferring oil from the reservoir to the cartridge outlet;

pump means, external to the cartridge, for pumping oil from an initially full cartridge reservoir to the oil distribution system and for pumping oil from the oil distribution system into the cartridge reservoir prior to removal and replacement of the cartridge.

7. The oil filter/reservoir of claim 6 where the cartridge is recyclable plastic and the oil filter is recyclable so that the entire cartridge, containing the contaminated oil from the engine, can be recycled after use.

8. The oil filter/reservoir of claim 6 and further comprising: conduits to the cylinder heads of the engine from the cartridge outlet; and spray heads on said conduits which spray oil onto the cylinder heads of the engine.

9. The combined oil filter/reservoir of claim 6 and further comprising:

said cartridge means having a cover plate and a body portion with a sealing means disposed therebetween and wherein said cover plate is removable from said body portion and the filter can be removed from the cartridge.

10. The combined oil filter/reservoir of claim 9 and further comprising:

wherein said sealing means between the cover plate and the body portion is a tongue and groove and O-ring assembly.

11. The combined oil filter/reservoir of claim 6 and including a float means disposed within said cartridge for activating and deactivating said pump means.

12. A combined oil filter/reservoir for an internal combustion engine comprising:

a cartridge means with an inlet from the engine and an outlet to the engine;

a filter located within the cartridge means and below the inlet for filtering impurities out of the oil;

a reservoir located within the cartridge means, below the outlet, having sufficient capacity to hold all of the oil necessary for lubrication of the engine;

means for transferring oil from the reservoir to the outlet from where it is recirculated through the engine and back again; and a baffle extending across the bottom of the filter and located between the filter and the reservoir for allowing oil to seep from the filter into the reservoir.

13. A combined oil filter/reservoir for an internal combustion engine comprising:

a cartridge means comprised of recyclable plastic with an inlet from the engine and an outlet to the engine;

a filter located within the cartridge means and below the inlet for filtering impurities out of the oil;

a reservoir located within the cartridge means, below the outlet, having sufficient capacity to hold all of the oil necessary for lubrication of the engine; and means for transferring oil from the reservoir to the outlet from where it is recirculated through the engine and back again.

14. A combined oil filter/reservoir for an internal combustion engine comprising:

a cartridge means with an inlet from the engine and an outlet to the engine;

a filter located within the cartridge means and below the inlet for filtering impurities out of the oil;

a reservoir located within the cartridge means, below the outlet, having sufficient capacity to hold all of the oil necessary for lubrication of the engine;

means for transferring oil from the reservoir to the outlet from where it is recirculated through the engine and back again; and said cartridge means has a cover plate and a body portion with a sealing means disposed therebetween and wherein said cover plate is removable from said body portion and the filter can be removed from the cartridge.

* * * * *